R. B. BENJAMIN.
CLUSTER LAMP SOCKET.
APPLICATION FILED APR. 14, 1904.

936,512.

Patented Oct. 12, 1909.

3 SHEETS—SHEET 1.

Witnesses:
Robert H. Weir
Curtis B. Camp

Inventor:
Reuben B. Benjamin
By: Jones & Addington
Attorneys.

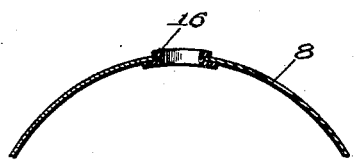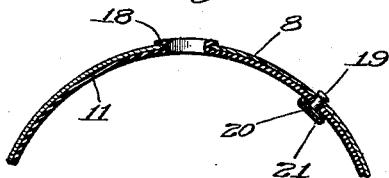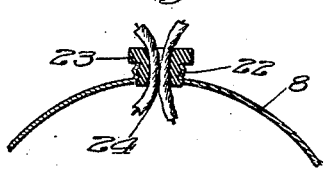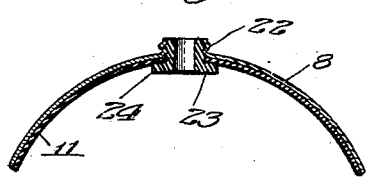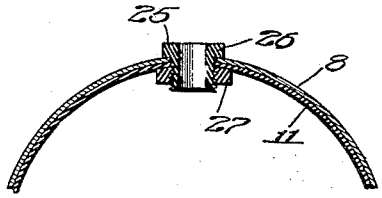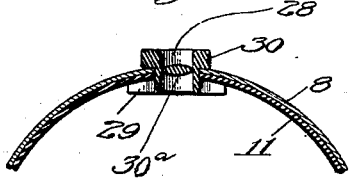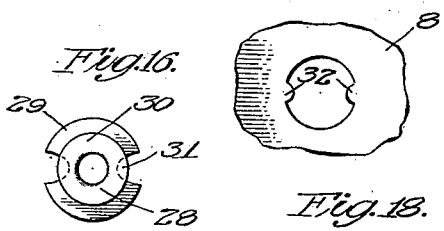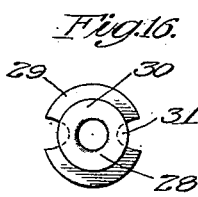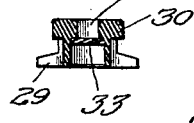

R. B. BENJAMIN.
CLUSTER LAMP SOCKET.
APPLICATION FILED APR. 14, 1904.
936,512.
Patented Oct. 12, 1909.
3 SHEETS—SHEET 3.
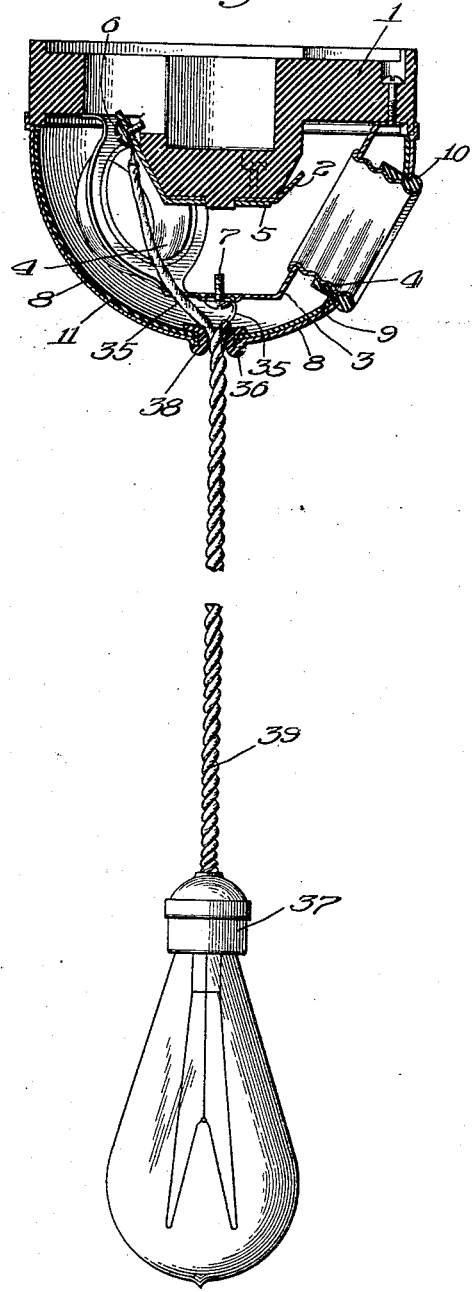
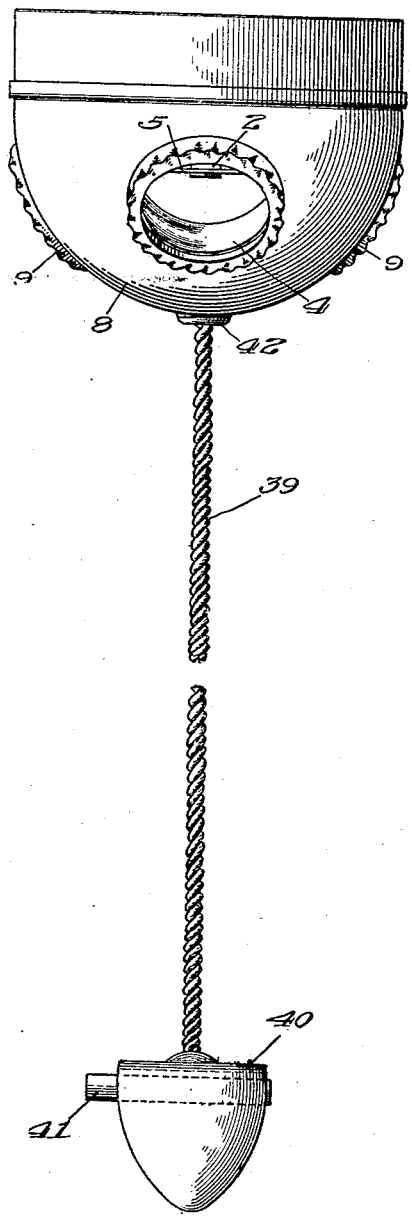
Witnesses:
Robert H. Weir
Curtis B. Camp
Inventor:
Reuben B. Benjamin
By: Jones & Addington
Attorneys

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

CLUSTER LAMP-SOCKET.

936,512.  Specification of Letters Patent.  Patented Oct. 12, 1909.

Application filed April 14, 1904. Serial No. 203,179.

*To all whom it may concern:*

Be it known that I, REUBEN B. BENJAMIN, a citizen of the United States, residing at Chicago, in the county of Cook and State of Illinois, have invented new and useful Improvements in Cluster Lamp-Sockets, of which the following is a full, clear, concise, and exact description, reference being had to the accompanying drawing, forming a part of this specification.

My invention relates to cluster lamp sockets, and more particularly to that class of sockets employing an outer metal casing or shell.

One of the objects of my invention is the provision of insulating means for said casing.

Another object of my invention is the provision of insulating means for a drop cord adapted to support a pendent lamp or switch.

The other objects and special features of my invention will more clearly appear from the accompanying drawings and description.

Figure 1:
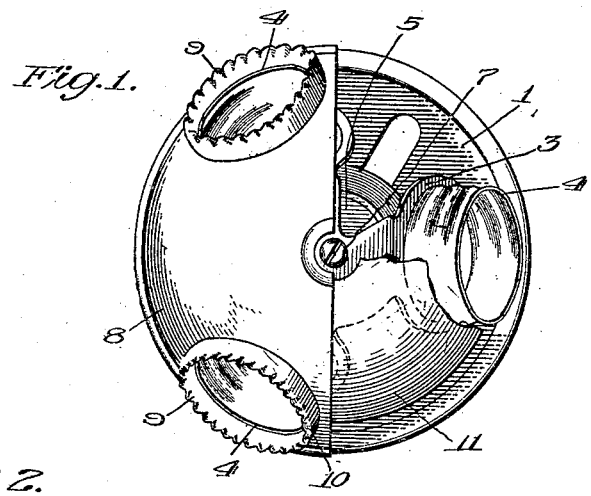
Figure 2:
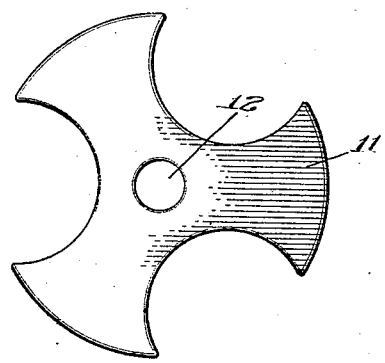
Figure 3:
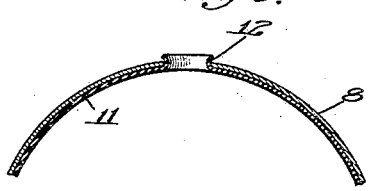
Figure 5:
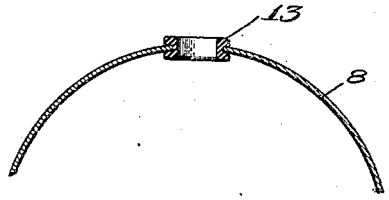
Figure 4:
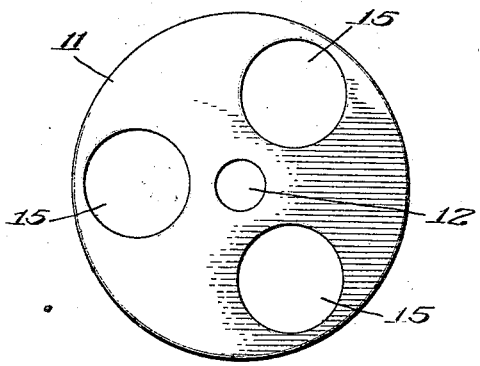
Figure 6:
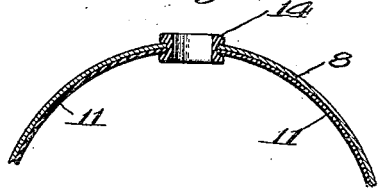

Referring to the drawings, in which like reference characters indicate like parts in the several figures, Figure 1 is a plan view of a cluster embodying my invention, showing the inclosing casing broken away to reveal the interior of the cluster; Fig. 2 is a view of the insulating lining; Fig. 3 is a sectional view of the casing showing one form of insulating lining; Fig. 4 is a plan view of the insulating lining; Fig. 5 is a sectional view of the casing showing one form of insulation for the central cord aperture; Fig. 6 is a sectional view of the casing and insulating lining, showing another form of insulation for the cord aperture; Fig. 7 is a sectional view of the casing and fiber washer; Figs. 8 and 9 are detail views of the washer shown in Fig. 7; Fig. 10 is a sectional view of the casing showing one method of attaching the insulating lining thereto; Fig. 11 is a view of the casing showing another form of insulation for the central cord aperture; Figs. 12 and 13 are sectional views of the casing and insulating lining, showing additional forms of insulation for the central cord aperture; Fig. 14 is a sectional view of the casing and insulating lining showing a blind support for the insulating lining; and, Fig. 15 is a detail view of the casing; Fig. 16 is a detail view of the blind insulating support; and, Fig. 17 is another form of the blind insulating support for the lining. Fig. 18 is a view of another form of insulating button for the cord aperture; Fig. 19 is a sectional view of the socket showing the pendent cord supporting an electric lamp; Fig. 20 is a view in full of the socket showing a pendent switch attached to the cord for controlling the lamps.

Referring to the drawings by reference characters, I provide a suitable base 1, of porcelain or other insulating material, carrying center contacts 2, 2, secured thereto by screws or bolts passing through the base 1, or in any suitable manner. A contact plate 3 is carried by the base 1, and has apertures formed therein, which register with the center contact plates 2, 2, lamp receiving shells 4, 4, constituting the outer contacts for the lamps being secured to said plate opposite the openings therein. The center contacts are preferably held in position by a ring 5, carrying a binding screw 6, for making connection with the leading-in wire, which passes through an aperture formed in the base 1. A binding screw 7 is carried by the plate 3 for making connection with the other leading-in wire. A substantially semi-spherical metal casing 8, having apertures formed therein adapted to register with the lamp receiving shells 4, is preferably held in position upon the base 1, by screw threaded bushings 9, 9, which are adapted to be secured upon the lamp receiving shells 4, and have a flange 10 formed thereon, arranged to secure the said casing or shell in position. A fiber lining 11 is disposed within said outer shell or casing, and is preferably formed as shown in Fig. 2, the edge of the central aperture 12 therein being turned outward, as shown in Fig. 3, and insulate a drop cord passing through the casing or shell 8 from said casing. The extended edges of said insulating lining 11, also serve to hold said lining in position within the casing 8, effectively insulating the shell 8 from the live parts of the cluster.

In Fig. 5 I have shown a modification of my invention in which a button 13, preferably formed of insulating fiber or composition, is disposed within the central cord aperture formed in the casing 8 for insulating said drop cord from said casing.

In Fig. 4 I have shown a modification of the insulating lining 11, which is preferably supported in position within the casing or shell 8, by means of the insulating button or washer 14, as shown in Fig. 6, and has apertures 15, 15, formed therein to accommodate the lamp receiving shells 4, 4.

In Fig. 7, a disk 16 of insulating material is disposed within the central cord aperture formed in the casing or shell 8, as shown in Fig. 8. The edge 17 of said disk is first drawn up as shown in Fig. 9, and then turned back upon the casing 8, as shown in Fig. 7.

In Fig. 10 the insulating lining 11 has the edge 18 thereof turned back upon the casing 8, to insulate the drop cord from said casing. In large clusters it is desirable to have additional means for securing the insulating lining to the casing or shell 8. I preferably provide for this purpose a button or stud 19 made of metal, having an enlarged end 20, and covered with insulating material 21, to insulate it from the lamp contacts, arranged to be inserted through an aperture formed in the insulating lining 11, and the casing 8, the outer end of said stud being up-set to secure the same in position therein, as shown.

In Fig. 11 the casing 8 has an outwardly extending screw threaded flange 22 formed thereon, to receive a screw threaded bushing 23, which insulates the drop cord 24 from said casing.

In Fig. 12 the insulating bushing 23 is screwed into the flange 22 carried by the casing 8 from the inside of the socket, the flange 24 carried by the said bushing being adapted to support the insulating lining in position within said casing.

In Fig. 13 the insulating lining 11 is held in position within the casing 8, by means of a screw threaded bushing 25 of insulating material, the flange 26 carried by said bushing and the nut 27 adapted to be screwed upon the same, co-acting to support the insulating lining 11 within the casing 8.

In Fig. 14 a button 28 is disposed within the central cord aperture formed in the casing 8, and has an inner flange 29 and an outer flange 30, which hold the insulating lining 11 within said casing. A small groove 31 is formed in the insulating button 28, as shown in Fig. 16, the small projections 32, 32, formed upon the cord aperture in the casing 8, being adapted to spring over the outer flange 30 and to rest within the groove 31, the flange 30 retaining the button 28 within the cord aperture formed in the casing 8.

Disposed within the aperture formed in the button 28 is a thin partition 30ª formed integral therewith, which forms a blind insulating button, as shown in Fig. 14, having a portion which may be punched out to form a cord aperture through said insulating button, if desired.

In Fig. 17 I have shown the insulating button 28 having a cord aperture formed therein, preferably having a shoulder or offset in the walls thereof, adapted to support an insulating washer 33 to form a blind insulating button for the socket. The washer 33 is removable to permit a pendent cord to pass through the aperture formed in the insulating-button 28, when it is desired to connect a pendent switch or light to the cluster.

The insulating member 34 shown in Fig. 18, is preferably formed of insulating fiber and may be made solid or with an aperture therein, as shown in dotted lines. The flanges carried by said member are adapted to support the insulating lining in position and to insulate the cord aperture from the casing. The upper flange adapted to rest upon the exterior of the casing is made small, to permit the insulating member to be sprung into position within the cord aperture.

In Fig. 19, conductors 35, 35, attached to the binding screws 6 and 7, are adapted to pass through the insulating washer or button 36, and support the electric lamp 37 and connect the same in the circuit, the insulating button 36 insulating said conductors from the casing 8, and the inwardly turned flange 38, formed upon the said insulating member retaining the insulating lining 11 in position within said casing.

In Fig. 20 the pendent cord 39 consisting of conductors 35, 35, is shown as supporting and electrically connecting in circuit a pendent switch 40 having a push rod 41 for controlling the lamps carried by the socket, an insulating member 42 being adapted to insulate the conductors constituting the pendent cord 39 from the inclosing casing or shell 8.

It will be understood that any form of lamp and any form of pendent switch may be secured to the conductors 35, 35, and said conductors may be electrically connected with the contacts of the socket in any suitable manner.

It will be understood that the insulating means for the outer casing above described are applicable to any form of inclosing casing for an electric lamp cluster, and that the means illustrated and described for insulating the central cord aperture formed in said casing, are applicable to any form of opening in the inclosing casing of an electric lamp cluster.

It will be understood that the above described insulating means are adapted for use with electric lamp clusters containing any desired number of electric lamps and of any preferred construction.

As clearly appears from the above description, my invention contemplates a plural lamp cluster or socket having a suitable basic or supporting part, and a metallic casing associated therewith and having lamp openings to accommodate the passage of the lamp bases, the lamp receivers, binding posts and other electrical conducting parts of the cluster being inclosed within the casing; an insulating lining faces the interior of the casing and is provided with openings or cut-away portions registering with the lamp openings; the lining preferably is of star form having radially extending arms adapted to pass between the adjacent lamp openings.

The casing and lining are provided with registering central apertures, through which a cord for a drop lamp or switch is adapted to pass, the conductors of the cord being connected with the binding posts within the casing. Within the aperture in the casing is a suitable insulating bushing which may be formed in any of the ways illustrated. The bushing which I preferably employ in practice, is the one having a thin partition adapted to be broken away, as this provides a dust proof casing in the event it is not desired to use a drop cord and if it is desired to use the drop cord, the partition can be readily broken away to accommodate the cord.

While I have described my invention with particular reference to the details of construction and method of attaching the insulating means to the socket casing, I do not wish to limit myself to said details, as I am aware that many changes may be made therein without departing from the spirit of my invention, and I do not limit myself to the particular construction shown and described, further than is defined in the appended claims.

Having described my invention what I claim as new and desire to secure by Letters Patent is:

1. In a plural lamp cluster, a suitable basic or supporting part, a metallic casing having lamp openings and inclosing the electrical conducting parts of the cluster, a pair of binding posts within said casing, said casing having a central aperture to accommodate a lamp or switch cord, the conductors of which are adapted to be connected with said binding posts, an insulating lining for said casing and a bushing of insulating material disposed in said aperture to insulate said cord from the metallic casing and to secure said insulating lining to said casing.

2. In a plural lamp cluster, a suitable basic or supporting part, a bowl-shaped metallic casing having circularly arranged lamp openings and inclosing the electrical conducting parts of the cluster, a pair of binding posts within said casing, a corresponding insulating lining facing the interior of said casing, and having openings or cut-away portions registering with the lamp openings in said casing, said casing and lining having registering central apertures to accommodate a lamp or switch cord, the conductors of which are adapted to be connected with said binding posts, and an insulating bushing passing through said aperture to insulate said cord from the metallic casing, and to assist in holding said lining in position.

3. The combination with a metallic casing having an aperture therethrough, of an insulating bushing in said aperture having a thin partition adapted to be broken away, as and for the purpose described.

4. In a plural lamp socket, the combination with associated lamp contacts, of a suitable support therefor, an inclosing casing or shell for the socket, said casing having an aperture formed therein adapted to accommodate an electrical conductor, an insulating button or washer disposed within said aperture, said washer having a depression formed therein and a thin partition of insulating material disposed within said depression.

5. In a plural lamp socket, the combination with associated lamp contacts, of a suitable support therefor, an inclosing casing or shell for the socket, said casing having an aperture formed therein adapted to accommodate an electrical conductor, an insulating button or washer disposed within said aperture, said washer having an aperture formed therein, and a removable partition disposed within said aperture.

6. In a plural lamp socket, the combination with associated lamp contacts, of a suitable support therefor, an inclosing casing or shell for the socket, a suitable insulating lining for the casing, a pin extending through said lining and said casing for securing said casing thereto, and insulating means carried by said pin and arranged exteriorly of said lining.

In witness whereof, I have hereunto subscribed my name in the presence of two witnesses.

REUBEN B. BENJAMIN.

Witnesses:
C. B. CAMP,
WALTER E. McCORNACK.